US012682030B2

(12) United States Patent
Salamon

(10) Patent No.: US 12,682,030 B2
(45) Date of Patent: Jul. 14, 2026

(54) HAND STRUCTURE AUTHENTICATION SYSTEM AND METHOD

(71) Applicant: Dell Products, L.P., Round Rock, TX (US)

(72) Inventor: Victor Salamon, Edmonton (CA)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 18/366,127

(22) Filed: Aug. 7, 2023

(65) Prior Publication Data

US 2025/0053625 A1    Feb. 13, 2025

(51) Int. Cl.
*G06F 21/32*    (2013.01)

(52) U.S. Cl.
CPC .................................... *G06F 21/32* (2013.01)

(58) Field of Classification Search
CPC ................................. G06F 21/32; G06F 21/31
See application file for complete search history.

(56) References Cited

U.S. PATENT DOCUMENTS

| | | | | |
|---|---|---|---|---|
| 9,508,022 B2 * | 11/2016 | Russo | ................ | G06V 40/1371 |
| 9,646,192 B2 * | 5/2017 | Cheng | ................ | G06V 40/1365 |
| 10,528,791 B1 * | 1/2020 | Shanmuga Vadivel | ...................... | |
| | | | | G06V 40/1376 |
| 10,673,846 B2 * | 6/2020 | Goldberg | ............ | H04L 63/0853 |

| | | | | |
|---|---|---|---|---|
| 11,943,218 B2 * | 3/2024 | Chavakula | .......... | H04L 63/0861 |
| 12,424,030 B2 * | 9/2025 | Guo | .................... | G06V 40/1318 |
| 2003/0028784 A1 * | 2/2003 | Uchida | ................... | G06V 40/30 |
| | | | | 713/186 |
| 2009/0313693 A1 * | 12/2009 | Rogers | .................. | H04W 12/06 |
| | | | | 345/173 |
| 2015/0227740 A1 * | 8/2015 | Boshra | .................... | G06F 21/32 |
| | | | | 726/18 |
| 2015/0237046 A1 * | 8/2015 | Chang | .................... | G06F 21/32 |
| | | | | 726/7 |
| 2015/0324566 A1 * | 11/2015 | Miura | .................... | G06F 21/32 |
| | | | | 726/19 |
| 2018/0329415 A1 * | 11/2018 | Aoi | .................. | B60W 60/0053 |
| 2019/0245849 A1 * | 8/2019 | Goldberg | .............. | H04L 9/3231 |
| 2019/0268331 A1 * | 8/2019 | Toth | ....................... | H04L 63/102 |
| 2020/0260017 A1 * | 8/2020 | Ohkubo | ................. | H04N 7/147 |
| 2020/0311379 A1 * | 10/2020 | Lee | ........................... | G06T 7/11 |

FOREIGN PATENT DOCUMENTS

EP    3439346 A1 *    2/2019    ............. G06F 9/451

* cited by examiner

*Primary Examiner* — Mohamed A. Wasel
(74) *Attorney, Agent, or Firm* — Fogarty LLP

(57)    ABSTRACT

According to one embodiment, an Information Handling System (IHS) includes a surface device, a processor, and a memory with program instructions stored thereon that, upon execution by the processor, cause an Information Handling System (IHS) to receive a plurality of signals representing a plurality of pressure points that have been actuated on the surface device, generate a passcode according to a position of each pressure point relative to one another, and compare the generated passcode with a stored baseline passcode to authenticate the user. The pressure points represent at least one hand of the user.

20 Claims, 7 Drawing Sheets

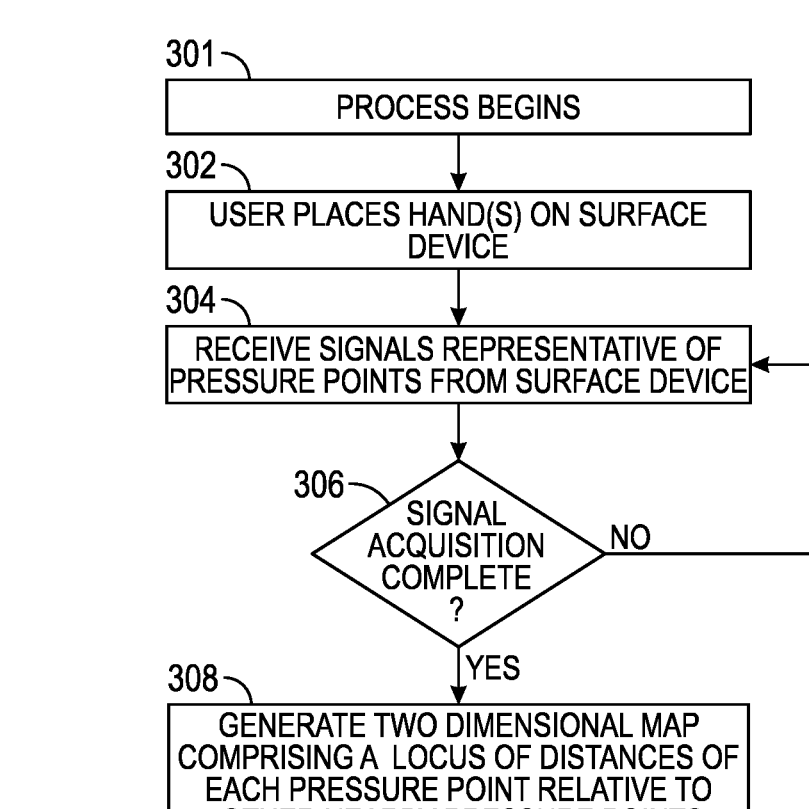

300

301 — PROCESS BEGINS

302 — USER PLACES HAND(S) ON SURFACE DEVICE

304 — RECEIVE SIGNALS REPRESENTATIVE OF PRESSURE POINTS FROM SURFACE DEVICE

306 — SIGNAL ACQUISITION COMPLETE ? — NO

YES

308 — GENERATE TWO DIMENSIONAL MAP COMPRISING A LOCUS OF DISTANCES OF EACH PRESSURE POINT RELATIVE TO OTHER NEARBY PRESSURE POINTS

310 — STORE TWO-DIMENSIONAL MAP AS A BASELINE PASSCODE IN A MEMORY OF THE IHS FOR LATER USE

312 — PROCESS ENDS

| FINGER/PALM PRESSURE POINT "PRESSED" | ACTUAL KEYBOARD PRESSED (KEYS OR TOUCHPAD) |
|---|---|
| LEFT HAND SMALL FINGER FINGERTIP | 2 |
| LEFT HAND SMALL FINGER DIP JOINT | Q |
| LEFT HAND SMALL FINGER PIP JOINT | A + CAPS LOCK |
| LEFT HAND SMALL FINGER MCP JOINT | Z + ALT |
| LEFT HAND PALM BASE | MOUSE TOUCHPAD TOP LEFT |

FIG. 7

HAND STRUCTURE AUTHENTICATION SYSTEM AND METHOD

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Security has become an important aspect of the IHSs operation as bad actors continually develop new ways to illicitly intrude into IHSs. For each IHS architectural makeup, several potential points of attack may exist for a malicious party to steal data, modify data, and/or engage in other illicit activities. To mitigate the potential for such attacks, a variety of techniques may be employed to enhance the security of IHSs. For example, password and/or other credential-based authentication between the various components of an IHS may be used to establish trust. Accordingly, such IHSs allow a user to create a separate user account with login information (e.g., a username and a password) for each of the different services. Because users, however, often have large numbers of different accounts for many different services, each having its own login information, users can find it difficult to remember and securely manage login information for each of the different services.

SUMMARY

According to one embodiment of the present disclosure, systems and methods for authenticating a user according to the structure of their hands are provided. According to one embodiment, an Information Handling System (IHS) includes a surface device, a processor, and a memory with program instructions stored thereon that, upon execution by the processor, cause an Information Handling System (IHS) to receive a plurality of signals representing a plurality of pressure points that have been actuated on the surface device, generate a passcode according to a position of each pressure point relative to one another, and compare the generated passcode with a stored baseline passcode to authenticate the user. The pressure points represent at least one hand of the user.

According to another embodiment of the present disclosure, a hand structure authentication method includes the steps of receiving a plurality of signals representing a plurality of pressure points that are presented on a surface device in which the pressure points representing a hand of a user. Using the received signals, the method further includes the steps of generating a passcode according to a position of each pressure point relative to one another, and comparing the generated passcode with a stored baseline passcode to authenticate the user.

According to yet another embodiment of the present disclosure, a computer program product includes a computer readable storage medium with program instructions stored thereon that, upon execution by an Information Handling System (IHS), cause the IHS to receive a plurality of signals representing a plurality of pressure points that have been actuated on a surface device in which the pressure points representing a hand of a user. The program instructions also cause HIS to generate a passcode according to a position of each pressure point relative to one another, and compare the generated passcode with a stored baseline passcode to authenticate the user.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 3A illustrates an example baseline passcode generation method according to one embodiment of the present disclosure.

FIG. 7 illustrates an example mapping table that may be used by the hand structure authentication system to map pressure points to the keys of a computer keyboard according to one embodiment of the present disclosure.

DETAILED DESCRIPTION

Figure 1:
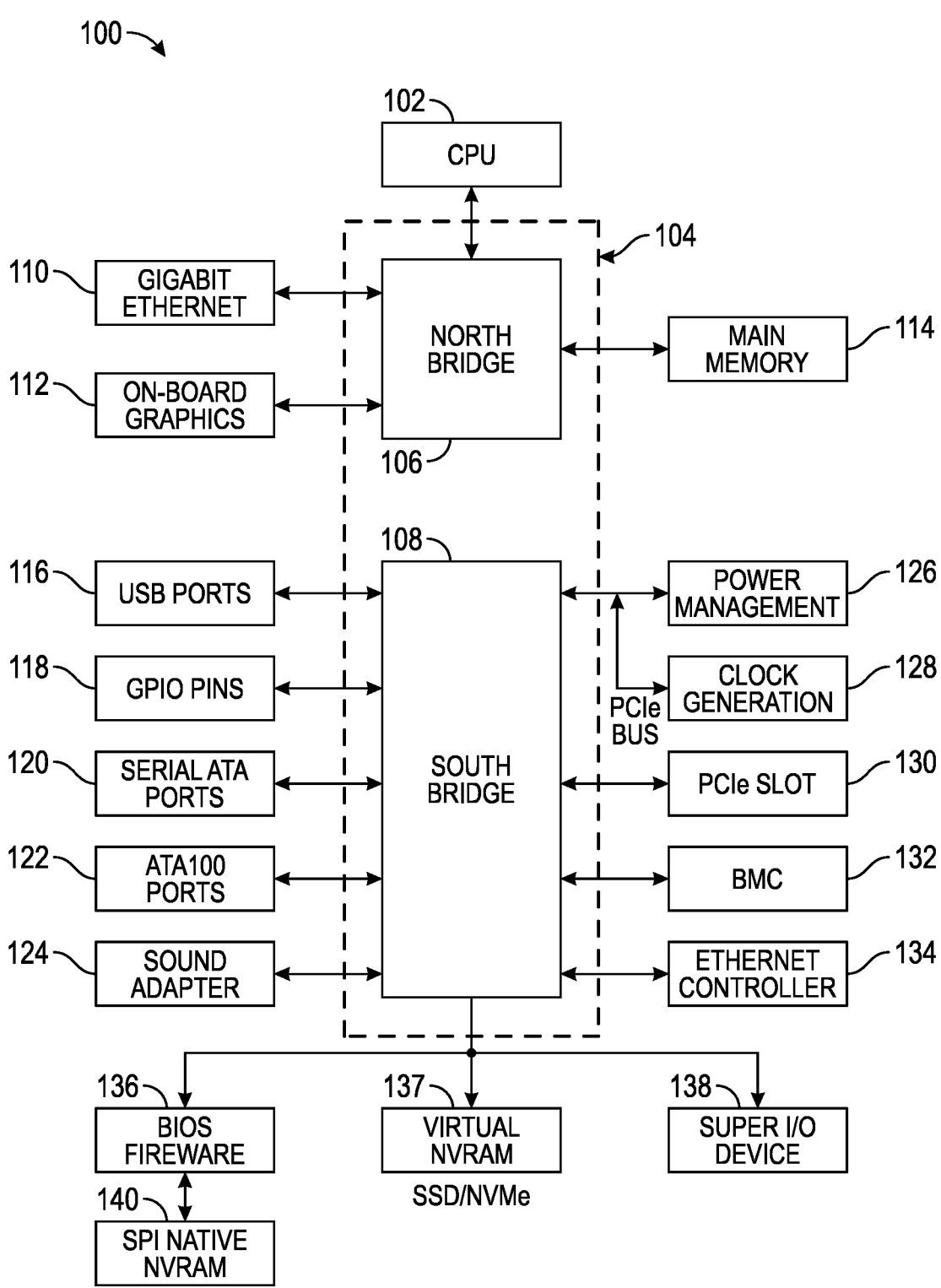
FIG. 1 shows an example of an IHS that may be configured to implement embodiments described herein.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Currently, many IHSs require a user login and password for access. Password managers have been introduced that consolidate multiple passwords under just one password, and two factor authentication is sometimes used to improve security, but none of these approaches actually eliminates passwords or improves the user experience. Nevertheless, passwords are now the most common security breach in computer systems. One way to steal someone's password is through the keyboard or pin pad that is used to authenticate a session. In the case of a high value target (e.g., a government official, financial institution employees, etc.), an attacker may exert extensive efforts to steal their passwords using state-of-the-art attack techniques. One basic user authentication point may include a physical terminal, such as the keypad on an Automatic Teller Machine (ATM), or the keyboard used with a computer terminal.

One of the basic attack vectors against terminal authentication is pin/password snooping. With pin/password snooping, an attacker can remotely observe a key sequence to a pin/password that is typed by a user. For example, nowadays surveillance/security cameras are ubiquitous, such as in shopping malls, stores, doorbell cameras, traffic cameras, rear view mirror mounted cameras, stoplight cameras, streetlamp cameras, smartphones, camera-equipped smart eyeglasses, and the like. These cameras record and sometimes stream all activities without the express permission or even knowledge of the people that are being viewed. Furthermore, these recordings and streams are often insufficiently protected, security-wise. Moreover, an attacker can observe and record what is being typed by these people, such as via a high powered/long distance telescope. Thus, in both cases of short key sequences (e.g., an ATM pin pad) or long key sequences (e.g., a Secure Shell (SSH) passphrase), the sequence can simply be observed and recorded for later playback and processing to prepare an authentication attack.

Several conventional solutions exist to protect against a snooping attack. For example, the user may simply cover the pin pad or keyboard while typing. This solution, however, is not perfect. In the case of a small numerical-only pin pad (e.g., square 9-digits area), the pin pad can be covered by one hand, while the other hand types. In general, for both pin pads and keyboards, there may be a physical cover over the keys that block remote observation. However, these approaches have a variety of problems. For example, typing while covering the keypad may also obscure user's view, and may be difficult for users who need to view the keypad when typing. If the keyboard is covered partially to allow the user to see the keyboard, the movement of the typing fingers may still be viewable and can be observed to replicate later on. A determined attacker can extract a variety of observed data from login recordings to extrapolate the login key sequence. The observed data can include: The fingers' placement (P) on the keyboard, the fingers' 3D motions (M) as they move across the keyboard, and the sound/click (C) pattern, which shall be referred to as PMC information. The attacker can reconstruct a simple pin from this PMC information.

For longer key sequences (e.g., passphrases), the attacker can apriori construct the PMC information for the entirety of the victim's dictionary. For example, the attacker can create PMC models for all the words of the English language, plus all known popular passwords. Then, the attacker can overlay the PMC observed in the recording, against the PMC model from the dictionary. Matches between the PMC model and the recorded PMC information can be used as candidate sequences to use. To further enhance the probability of success, the attacker can use statistical analysis to recreate actual words from the dictionary in case dictionary words was used as at least part of the passphrase.

Biometrics can be used to improve the security of logins by replacing pin sequences or passphrases. However, biometrics are problematic as well. For example, not all users may want to share their biometrics as means of authentication for privacy reasons. Biometrics are immutable, once compromised they will be compromised forever. High value targets may also get their biometrics stolen, cloned, and/or copied. Once the biometrics are stolen, they are useless forever for authentication purposes. If someone steals a high value target's fingerprints, iris pattern or other biometric signature, the high value target can never change their biometrics thus forever compromising their authentication.

Multi Factor Authentication (MFA) can increase the security of login session by asking for an additional independent verification (e.g., identity or separate value/token). However, when users use their phone as their main terminal, such as to authenticate a service, they use the same device as their second authentication device. Thus, the second identification is not really independent, disabling much of the main point of MFA. The MFA device could similarly be remotely snooped on as the authentication terminal itself. Additionally, MFA is usually not deployed in bank/ATM access services for convenience reasons.

There is a proposed improved security solution using a Randomized Dynamic Keyboard Transformation (RDKT). This solution adds an improved level of security by shifting the keys the user types, such that a remote observer's view of the password would be "fooled". This is a great security improvement; however we should layer on and dynamically vary multiple security methods (including our newly proposed method) to continuously improve authentication, especially for high value targets.

According to embodiments of the present disclosure, a non-observable non-biometric pressure typing system and method are provided that uses the physical features of the hands of a user to provide secure authentication. The hand structure authentication system and method may add an additional layer of security on top of existing solutions. A key observation discovered by the inventor is that it is the typing finger movements (e.g., lifting, lowering, side-movements, etc.) enables an attacker to observe/steal a passkey using PMC information, among others. The hand structure authentication system and method may also provide a technique for the user to introduce a passcode without the typing finger movements, while avoiding the disadvantages of previous solutions (e.g., biometrics, MFA, RDKT, etc.).

Specifically, the hand structure authentication system and method receives multiple signals representing multiple pressure points of a hand that have been actuated on a surface device, generates a passcode according to a position of each pressure point relative to one another, and compares the generated passcode with a stored baseline passcode to authenticate the user. For example, the user may place their fingers and palms on a surface statically (e.g., no movement of the fingers or palm). That is, the fingers and palm may remain static throughout the passcode authentication process, and the system and method authenticates the user. Few or none of the pressure points exerted by the user on the surface device can be remotely observed through PMC, because there is no movement and no sound. In other embodiments, the user may move their hands such that the pressure points are acquired sequentially relative to one another as will be described herein below.

Any suitable surface device may be used that can generate signals indicative of the arrangement and distance of the various pressure points on a human hand. Examples of such devices may include computer keyboards, touchscreens (e.g., laptop touchscreens with multi-touch enabled), and a specialized pressure-sensing device, which can have a flat, cylindrical, or spherical contact surface. In one embodiment, the surface area of a such a device can be devised to hide all or some fingers from view, which may be an additional security feature as the fingers will be even less observable.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS 100) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in one embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

Figure 2:
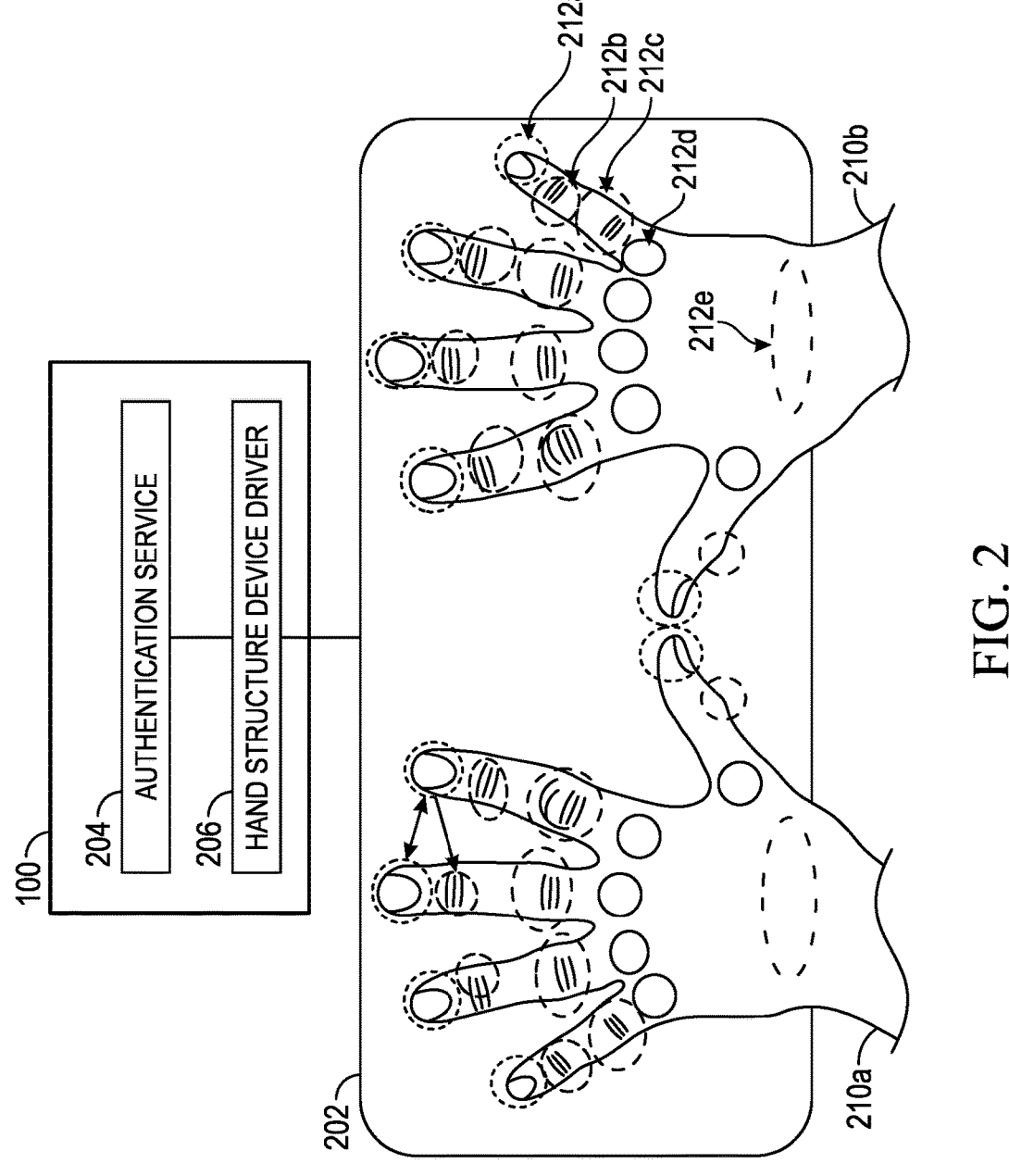
FIG. 2 illustrates an example hand structure authentication system according to one embodiment of the present disclosure.

FIG. 2 illustrates an example hand structure authentication system 200 according to one embodiment of the present disclosure. The hand structure authentication system 200 generally includes a surface device 202 coupled to an IHS 100, for example, that may be configured to authenticate a user. The IHS 100 includes an authentication service 204 that communicates with the surface device 202 via a hand structure device driver 206. The hand structure device driver 206 may be separate and distinct from other device drivers that are used for providing communication between the IHS 100 and the surface device 202, or the hand structure device driver 206 may form an integral part of one or more other device drivers that are used for providing communication between the IHS 100 and the surface device 202.

The authentication process may be any process in which the user is to be given privileged access. Examples of such authentication processes may include logging in to the IHS 100, establishing an online secure session with an Internet browser, obtaining privileged access to an application running on the IHS 100, and the like.

According to embodiments of the present disclosure, the surface device 202 generates signals indicative of the various physical features of a user's hands 210*a-b* (collectively 210), and the signals are processed by the authentication service 204 and hand structure device driver 206 to provide authentication services for the user. While the present embodiment shows both right and left hands being used, it should be appreciated that the hand structure authentication system 200 may be used with only the left hand 210*a* or only the right hand 210*b*. As shown, the surface device 202 is a specialized pressure-sensing device adapted specifically for generating signals indicative of the features of the user's hand. For example, the pressure-sensing device may be a resistive touchscreen, or a capacitive touchscreen coupled to the IHS 100 via a USB cable.

As shown, the various features of the human hands generate pressure points 212*a-e* when in contact with the surface device 202. The various features may include, for example, the fingertips 212*a*, finger joints 212*b-d*, and palms 212*e* of the hands 210. In particular, the first finger joint 212*b* from the fingertip 212*a* of each finger may be referred to as a distal interphalangeal joint (DIP), the second finger joint 212*c* from the fingertip 212*a* of each finger may be referred to as a proximal interphalangeal joint (PIP), and the third finger joint 212*d* from the fingertip 212*a* of each finger may be referred to as a metacarpophalangeal joint (MCP). Each of these pressure points 212 may be used for generating unique passcode for each user.

As can be seen in FIG. 2, two hands can be placed on the surface device 202 to support a total of 42 pressure points 212 capable of inducing individual pressure. That is, each hand 210 may support 21 pressure points, with 4 pressure points 212 for each finger, namely a fingertip and 3 joints, plus a larger pressure point 212 at the palm base. These 42 pressure points 212 can create a map of pressure points 212 (e.g., a Pressure Alphabet) to be used for creating a key sequence for authenticating. The pressure points 212, which may be considered to be the letters of the pressure alphabet, may be assigned with any convention, for example the term 'LF1FT' may represent the left hand finger 1, fingertip 212*a*, while the term 'LTMCP' may represent the left hand thumb MCP joint, and 'RF3DIP' may represent the right hand third middle finger DIP joint.

The unique arrangement of pressure points 212 on the surface device 202 may represent a unique passcode for that user. For example, the authentication service 204 may, for each detected pressure point 212, determine a distance to other nearby pressure points 212 to generate a hand structure-based passcode for the user. For example, the surface device 202 may for the left hand, finger 1 (index finger), fingertip pressure point 212 (LF1FT) measure a distance d1 to the left hand, finger 1, DIP joint (LF1DIP), a distance d2 to the left hand, finger 2 (middle finger), fingertip (LF2FT), and a distance d3 to the left hand, finger 2, DIP joint (LF2DIP). Similar distance values may be derived for the other pressure points 212 to determine the arrangement of the pressure points 212 for generating a unique hand structure-based passcode of the user.

This may be at least somewhat similar to the alphabet of accessible points on a QWERTY keyboard, namely 26 letters, 10 numbers, and special symbols for touch-typing. On a QWERTY keyboard, specific keys (e.g., 7 keys: shift, control, Fn, win, alt, Caps Lock, Tab, etc.) act as modifiers which give raise to a whole new set of alternate characters and/or commands on the keyboard, which expands the set of special characters from 10 to over 33. Similarly, some of the letters of the pressure alphabet can act as modifiers, which expand the set of available keys. For example, suppose 7 of the 42 pressure points are made be modifier letters similar to the 7 modifier keys listed above. The extended pressure alphabet will now have (42-7)*7=245 letters with one of the alphabet letters being the "Enter" key. In the human hand, not all pressure points 212 are equally sized, nor do they all exert the same precision when exerting pressure. For example, fingertips are most precise to control and to exert pressure, and that is what most touch-typists are used to. That is why fingertips are the first choice for regular typing. Each of the finger joints, plus palm base, can also be used to exert pressure in individual points or areas; however, the surface device 202 may need to process these points as less precise, when mapping to letters of the extended pressure alphabet. Users with less than two full hands may have similar challenges as on regular keyboards. They would access a smaller pressure alphabet without moving their hands. To access the full alphabet they have options (ex. choose longer key sequences, or use one hand but select two distinct positions on the surface).

FIG. 3A illustrates an example baseline passcode generation method 300 according to one embodiment of the present disclosure. Additionally or alternatively, the baseline passcode generation method 300 may be performed by the hand structure authentication system 200 as described above with reference to FIG. 2. In a particular example, the baseline passcode generation method 300 when a user desires to generate a hand structure-based passcode. For example, the baseline passcode generation method 300 may be performed initially to generate a baseline passcode that is stored in a memory of the IHS 100 for later use.

Initially at step 301, the baseline passcode generation method 300 begins. At step 302, the user places their hand(s) 210 on the surface device 202. The user can use either their left hand, right hand, or both hands. Additionally, the user may press with all their available pressure points, to establish the working area for the surface to recognize as their palms. This gesture may define the pressure sensing working area, so that all subsequent pressure points may be interpreted relative to this established area. In some instances, the user may start "typing" by exerting pressure on the pressure points of their choice. Just like with touch-typing with fingertips, users can choose to exert one pressure-point at one time, or multiple pressure-points simultaneously.

At step 304, the baseline passcode generation method 300 receive signals from the surface device 202 that are representative of pressure points of the user's hand(s) 210. The signals may be, for example, key codes representing particular locations (e.g., x and y coordinates) on the surface device 202. In one embodiment, the baseline passcode generation method 300 may use some, most, or all available pressure points of the user's hand(s). The user can use a certain sequence of a subset of the available pressure points to establish a passcode that is best for both their security and their ability to memorize. For example, the baseline passcode generation method 300 may acquire all fingertips 212*a* from left to right, twice, followed by all MCP joints 212*d* from right to left to create the passcode. As another example, the baseline passcode generation method 300 may acquire the location of the palm Base 212*e* of left hand, all MCP joints 212*d* of right hand from right to left. As yet another example, the baseline passcode generation method 300 may acquire alternate fingertips 212*a* of left hand, and PIP joints 212*c* of the right hand, simultaneously, from the outward finger and continuing inward. In one embodiment, if the hand structure-based passcode acquisition is being performed for the first time, the baseline passcode generation method 300 may reject trivial (e.g., easy to guess) passcode sequences. Because these sequences can be visualized by looking at one's hands, the learning curve for this type of sequence may be relatively easy to remember in some embodiments.

Thereafter at step 306, the baseline passcode generation method 300 determines if signal acquisition has been completed. For example, the baseline passcode generation method 300 may be responsive to a key code representing a particular key (e.g., "enter" key) to indicate that signal acquisition has been completed. If so, processing continues at step 308; otherwise, processing continues at step 304 in which the baseline passcode generation method 300 continues acquiring additional key codes.

The baseline passcode generation method 300 at step 308 then generates a two dimensional map comprising a locus of distances of each pressure point 212 relative to other nearby pressure points 212. In one embodiment, the driver 206 may identify the type of each pressure point 212 based on its location relative to the location of other pressure points 212. For example, the driver 206 may identify an index finger DIP due to its location between the index fingertip and index finger PIP.

At step 310 baseline passcode generation method 300 stores the passcode as a baseline passcode in a memory of the IHS 100 for later use. Thereafter at step 312, the method 300 ends. At this point, a baseline passcode for the user has been generated, and the system 200 is ready to authenticate the user at any time in the future.

Figure 3B:
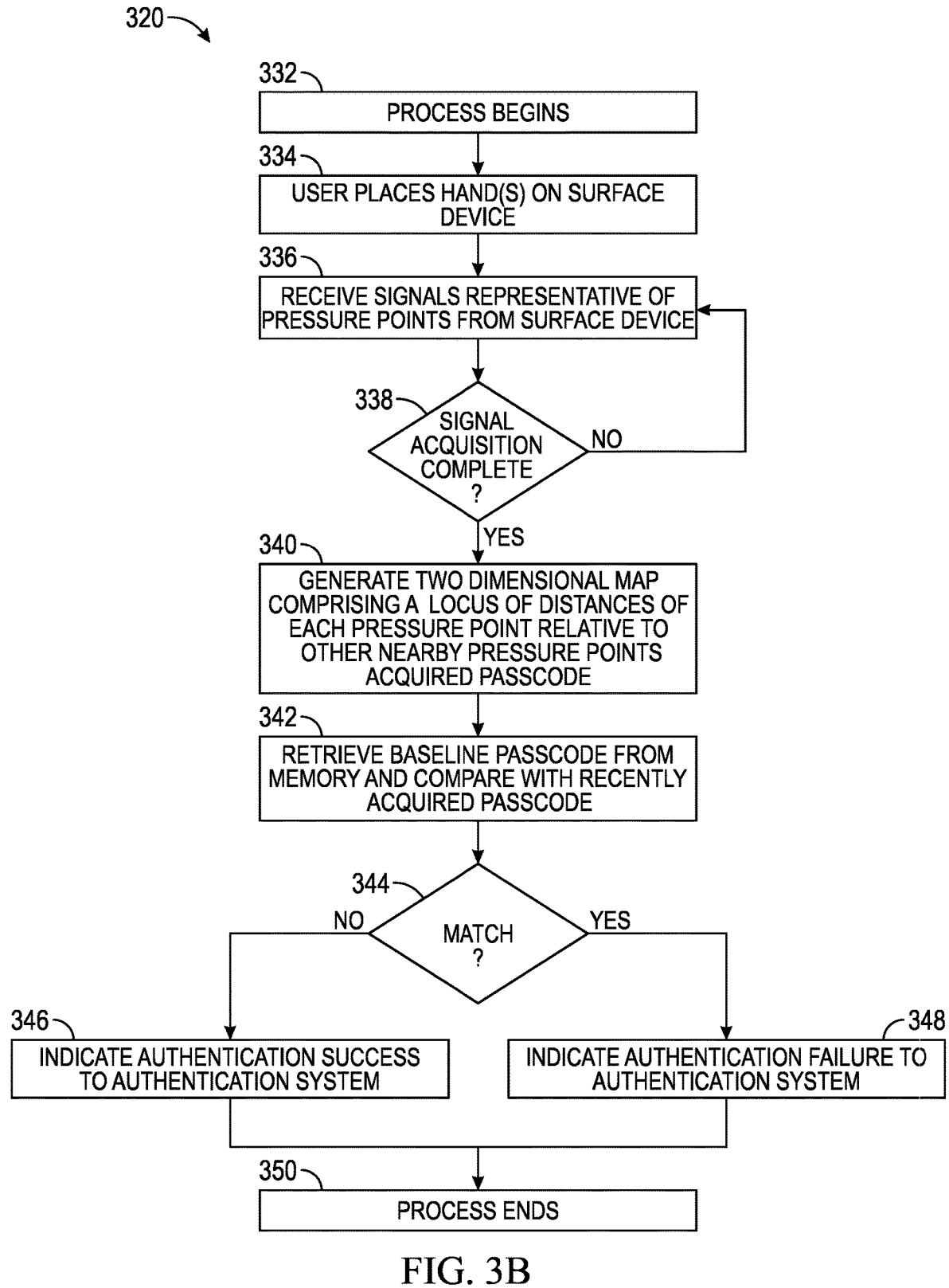
FIG. 3B illustrates an example hand structure authentication method according to one embodiment of the present disclosure.

FIG. 3B illustrates an example hand structure authentication method 330 according to one embodiment of the present disclosure. Additionally or alternatively, the hand structure authentication method 330 may be performed by the hand structure authentication system 200 as described above with reference to FIG. 2. In a particular example, the hand structure authentication method 330 may be performed any time a user desires to be authenticated with an authentication system using the hand structure authentication system 200.

Initially at step 332, the process begins. Thereafter at step 334, the user places their hand(s) 210 on the surface device 202. As described above with reference to step 302 of FIG. 3A, the user can use either their left hand, right hand, or both hands. Additionally, the user may press with all their available pressure points, to establish the working area for the surface to recognize as their palms.

At step 336, the hand structure authentication method 330 receive signals from the surface device 202 that are representative of pressure points of the user's hand(s) 210. Thereafter at step 338, the hand structure authentication method 330 determines if signal acquisition has been completed. For example, the hand structure authentication method 330 may be responsive to a key code representing a particular key (e.g., "enter" key) to indicate that signal acquisition has been completed. If so, processing continues at step 340; otherwise, processing continues at step 304 in which the hand structure authentication method 336 continues acquiring additional key codes.

The hand structure authentication method 330 at step 340 then generates a two dimensional map comprising a locus of distances of each pressure point 212 relative to other nearby pressure points 212 as an acquired passcode. In one embodiment, the driver 206 may identify the type of each pressure point 212 based on its location relative to the location of other pressure points 212. For example, the driver 206 may identify an index finger DIP due to its location between the index fingertip and index finger PIP.

At step 342 the hand structure authentication method 330 retrieves the stored baseline passcode from memory and compare with the recently acquired passcode. At step 344, the hand structure authentication method 330 determines whether a match between the stored baseline passcode and the recently acquired passcode exists. If so, the hand structure authentication method 330 indicates an authentication success to the authentication system 200 at step 346; otherwise, it indicates an authentication failure to authentication system 200 at step 348. The hand structure authentication method 330 may be repeatedly performed each time an authentication process is to be conducted. Nevertheless, when use of the hand structure authentication method 330 is no longer needed or desired, the process ends at step 350.

Although FIGS. 3A and 3B describe example methods 300, 330 that may be performed to perform a hand structure-based passcode acquisition, the features of the methods 300, 330 may be embodied in other specific forms without deviating from the spirit and scope of the present disclosure. For example, the methods 300, 330 may perform additional, fewer, or different operations than those described in the present examples. For another example, the methods 300, 330 may be performed in a sequence of steps different from that described above. As yet another example, certain steps of the methods 300, 330 may be performed by other components in the IHS 100 other than those described above.

Figure 4:
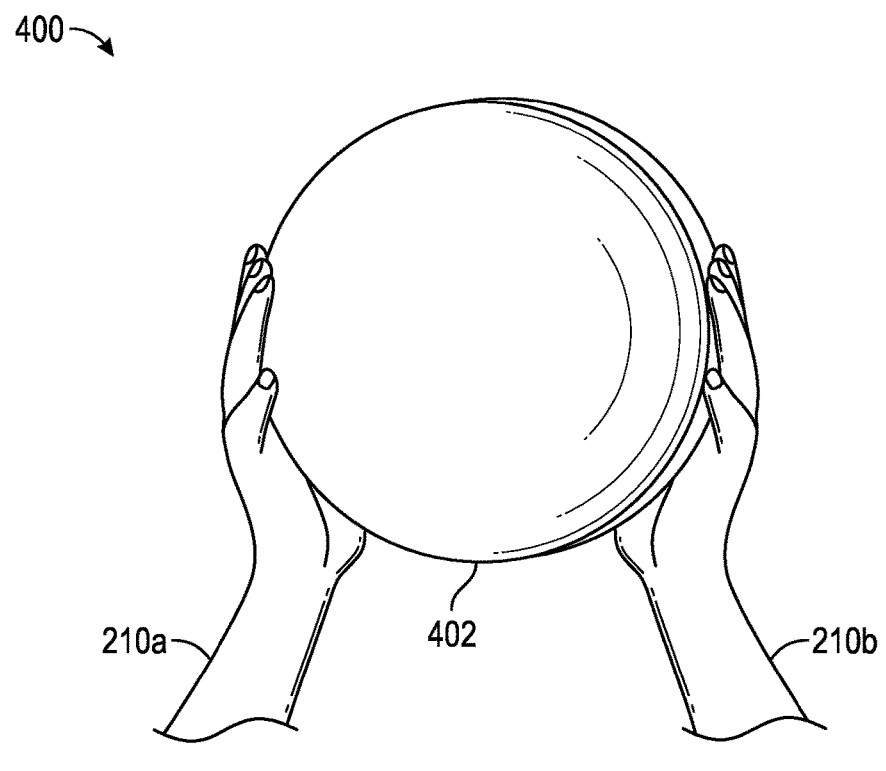
FIG. 4 illustrates another example surface device that may be used with the hand structure authentication system according to one embodiment of the present disclosure.

FIG. 4 illustrates another example surface device 400 that may be used with the hand structure authentication system 200 according to one embodiment of the present disclosure. Whereas the surface device 202 shown in FIG. 2 is generally flat, the surface device 400 possesses a cylindrical shape so that it closely conforms to the natural shape of the user's hands. The surface device 400 has an outer surface 402 configured with circuitry to detect the pressure points 212 of one or both of the user's hand(s) 210. One particular advantage of the surface device 400 configured with a cylindrical pressure sensitive surface is that it can potentially hide the series of finger movements that are being performed in some embodiments. While the present embodiment is described as being generally cylindrical in shape, it should be appreciated that in other embodiments, the surface device 400 may have any contoured (e.g., curved) shape, such as a spherical shape, an egg shape, an elliptical shape, and the like.

Figure 5A:
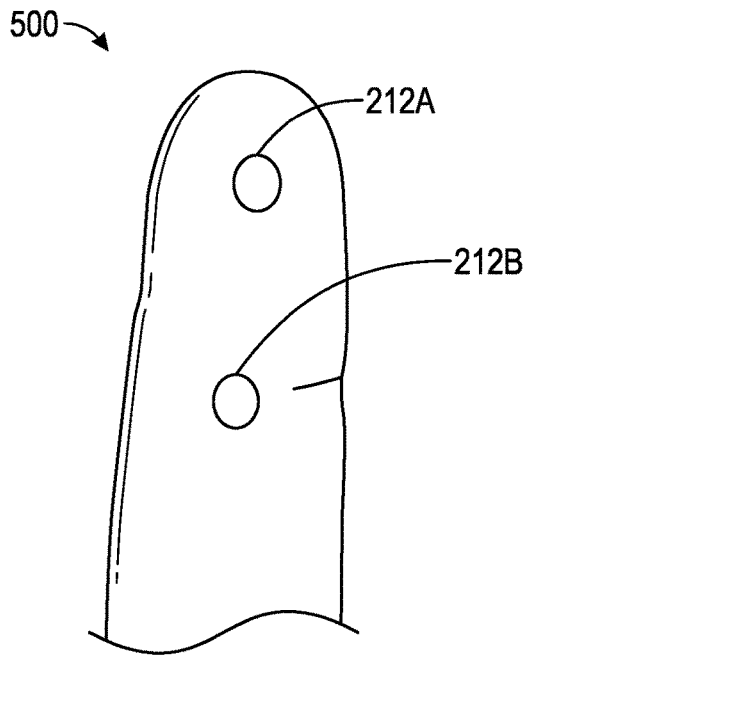
FIGS. 5A and 5B illustrate certain pressure points that may be generated for a user's hand according to one embodiment of the present disclosure.
Figure 5B:
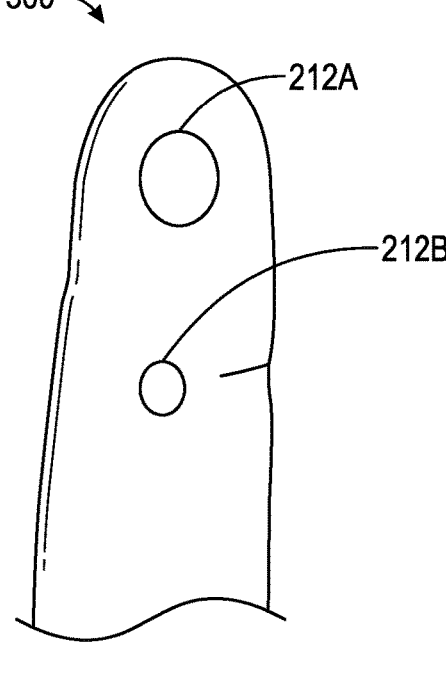

FIGS. 5A and 5B illustrate certain pressure points 212 that may be generated for a user's hand according to one embodiment of the present disclosure. As shown, the surface device 202, 400 may utilize an amount of pressure that is applied to certain pressure points 212 to add more variation in the type of passcode that is generated, particularly when the surface device 202, 400 is embodied as a touchscreen device. In particular, FIG. 5A shows fingertip 212a that is pressing lightly on the surface device 202, 400 while FIG. 5B shows the same fingertip 212a which is applying a greater level of pressure on the surface device 202, 400.

To provide a particular example finger sequence, the fingers & palms of the user's hand(s) 210 can rest on the surface device 202, 400 with minimal touching as shown in FIG. 5A. This establishes a baseline touch pattern of minimal touch in a resting position. Next, when the user manipulates certain fingers to sequentially apply more pressure, the skin area touching the touchscreen surface is larger, which is indicated by the expanded skin touching area as shown in FIG. 5B. It then uses the area difference between the "light touch" and "pressed" surface area to differentiate a level of pressure applied by the user. That is, the surface device 202, 400 would detect each time a pressure point is pressed by identifying that the area of touch has grown relative to what was established in step baseline touch pattern.

Figure 6:
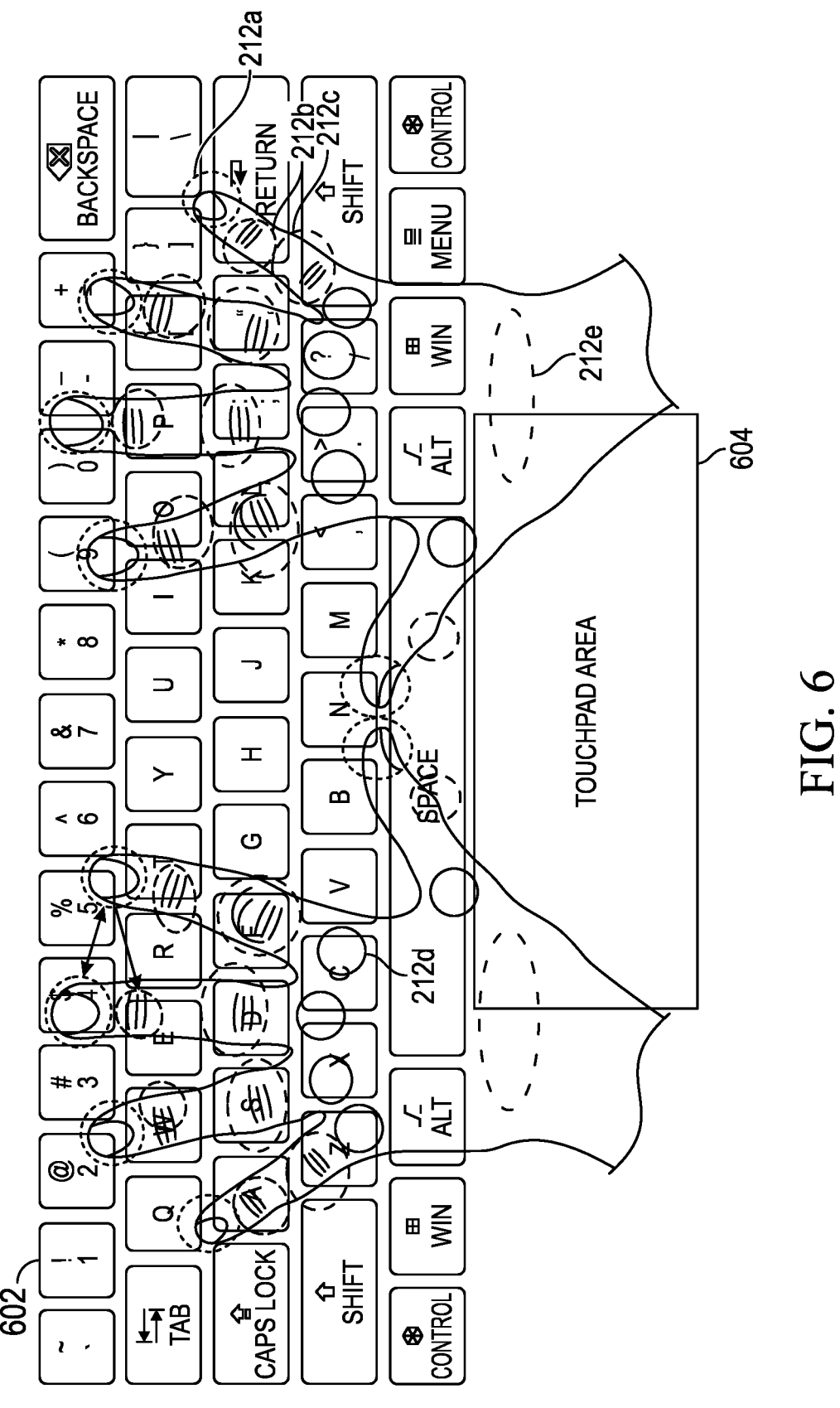
FIG. 6 illustrates another example surface device that may be used with the hand structure authentication system according to one embodiment of the present disclosure.

FIG. 6 illustrates another example surface device 600 that may be used with the hand structure authentication system 200 according to one embodiment of the present disclosure. The particular surface device 600 as shown is a standard computer keyboard 602 with a touchpad 604. The computer keyboard 602 may be considered to be a low resolution pressure sensitive device. In one embodiment, it would be beneficial to use keyboards with flat keys, so that a nearby observer does not easily see which keys are depressed when pressure points 212 are applied. Furthermore, the touchpad 604 next to the keyboard 602 can also be used to sense certain pressure points 212. For example, the hand structure authentication system may prompt the user touch the touchpad 604 with their palms and their fingers on the keyboard 602 with sufficient pressure such that the keys underneath the pressure points 212 of the user's hand are depressed and recorded by the hand structure authentication system.

FIG. 7 illustrates an example mapping table 700 that may be used by the hand structure authentication system 200 to map pressure points to the keys of a computer keyboard according to one embodiment of the present disclosure. The mapping table 700 includes a first column 702 that indicates a number of pressure points 212 that may be applied by the left hand of the user, and a second column 704 each indicating one or more keys that may be pressed by the pressure points 212. It is noted that although only the pressure points 212 of the left hand are shown for purposes of clarity and brevity of disclosure, the mapping table 700 may also map the pressure points 212 of the right hand of the user.

For an initial tuning, the hand structure authentication system 200 may provide a procedure where each pressure point 212 is pressed individually, in a pre-defined sequence to independently map the pressure points 212 from the fingers to their respective keyboard keys. This initial procedure establishes which keyboard keys are pressed when each of the finger pressure points is pressed. For example, when the first joint (DIP) 212b is pressed, that might map to one keyboard key being pressed, or it might map to more than one keyboard key being pressed. Thus, the baseline mapping may be based on a hand position, and the system 200 baselines that position. A different hand position may yield a different baseline mapping. For example, if the hands were set slightly higher on the computer keyboard, pressing the palm base of the left hand may actuate the spacebar and/or alt keys.

Examples exist where one pressure point 212 maps to a single key (e.g., when the pressure point is more focused, such as a fingertip). Other pressure points 212 may map to multiple keyboard keys being actuated as other pressure points are less focused because their surface area is larger, and their control is reduced. For the less focused pressure points, the hand structure device driver 206 may accept either of the listed keys (and even neighbor keys) as valid when pressed or actuated. In essence, the hand structure device driver 206 may generate a virtual hand shape over the computer keyboard, with more permissive consideration for the less focused points. That is, the hand structure authentication system may apply relatively greater weightings to certain pressure points while applying relatively lesser weightings to other pressure points. The security of the login may not be compromised, however, as it depends on a long sequence of points pressed at many points across the computer keyboard.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A hand structure authentication system comprising:
a surface device;
a processor; and
a memory coupled to the processor, the memory having program instructions stored thereon that, upon execution, cause an Information Handling System (IHS) to:
   receive a plurality of signals representing a plurality of pressure points that have been actuated on the surface device, the pressure points representing a static relative position of a plurality of features of a hand of a user, wherein one of the features comprises at least one of a finger joint and a palm of the user;
   generate a passcode according to a position of each pressure point relative to one another; and
   compare the generated passcode with a stored baseline passcode to authenticate the user.

2. The hand structure authentication system of claim 1, wherein the program instructions, upon execution, further cause the IHS to apply relatively greater weightings to certain pressure points while applying relatively lesser weightings to other pressure points.

3. The hand structure authentication system of claim 1, wherein the program instructions, upon execution, further cause the IHS to receive the plurality of signals simultaneously.

4. The hand structure authentication system of claim 1, wherein the program instructions, upon execution, further cause the IHS to receive at least some of the plurality of signals sequentially.

5. The hand structure authentication system of claim 1, wherein another one of the features comprises a fingertip of the user.

6. The hand structure authentication system of claim 1, wherein the program instructions, upon execution, further cause the IHS to generate the passcode according to a relative pressure of at least one of the pressure points relative to one another.

7. The hand structure authentication system of claim 1, wherein the program instructions, upon execution, further cause the IHS to generate the passcode according to a position of a subset of the pressure points relative to one another.

8. The hand structure authentication system of claim 1, wherein the surface device comprises at least one of a computer keyboard, a touchpad, or a touch screen.

9. The hand structure authentication system of claim 1, wherein the surface device comprises a curved shape.

10. A hand structure authentication method comprising:
receiving a plurality of signals representing a plurality of pressure points that have been actuated on a surface device, the pressure points representing a static relative position of a plurality of features of a hand of a user, wherein one of the features comprises at least one of a finger joint and a palm of the user;
generating a passcode according to a position of each pressure point relative to one another; and
comparing the generated passcode with a stored baseline passcode to authenticate the user.

11. The hand structure authentication method of claim 10, further comprising applying relatively greater weightings to certain pressure points while applying relatively lesser weightings to other pressure points.

12. The hand structure authentication method of claim 10, further comprising receiving the plurality of signals simultaneously.

13. The hand structure authentication method of claim 10, further comprising receiving at least some of the plurality of signals sequentially.

14. The hand structure authentication method of claim 10, further comprising generating the passcode according to a relative pressure of at least one of the pressure points relative to one another.

15. The hand structure authentication method of claim 10, further comprising generating the passcode according to a position of a subset of the pressure points relative to one another.

16. A computer program product comprising a non-transitory computer readable storage medium having program instructions stored thereon that, upon execution by an Information Handling System (IHS), cause the IHS to:
receive a plurality of signals representing a plurality of pressure points that have been actuated on a surface device, the pressure points representing a static relative position of a plurality of features of a hand of a user, wherein one of the features comprises at least one of a finger joint and a palm of the user;
generate a passcode according to a position of each pressure point relative to one another; and
compare the generated passcode with a stored baseline passcode to authenticate the user.

17. The computer program product of claim 16, wherein the program instructions, upon execution, further cause the IHS to apply relatively greater weightings to certain pressure points while applying relatively lesser weightings to other pressure points.

18. The computer program product of claim 16, wherein the program instructions, upon execution, further cause the IHS to receive the plurality of signals simultaneously.

19. The computer program product of claim 16, wherein the program instructions, upon execution, further cause the IHS to receive at least some of the plurality of signals sequentially.

20. The computer program product of claim 16, wherein the program instructions, upon execution, further cause the IHS to generate the passcode according to a relative pressure of at least one of the pressure points relative to one another.

* * * * *